(No Model.) 4 Sheets—Sheet 2.
A. KLINK.
CORN PLANTER.

No. 527,429. Patented Oct. 16, 1894.

Witnesses:
L. C. Hills.
Helena Bauer

Inventor:
Adam Klink,
by Collamer & Co.,
Attorneys

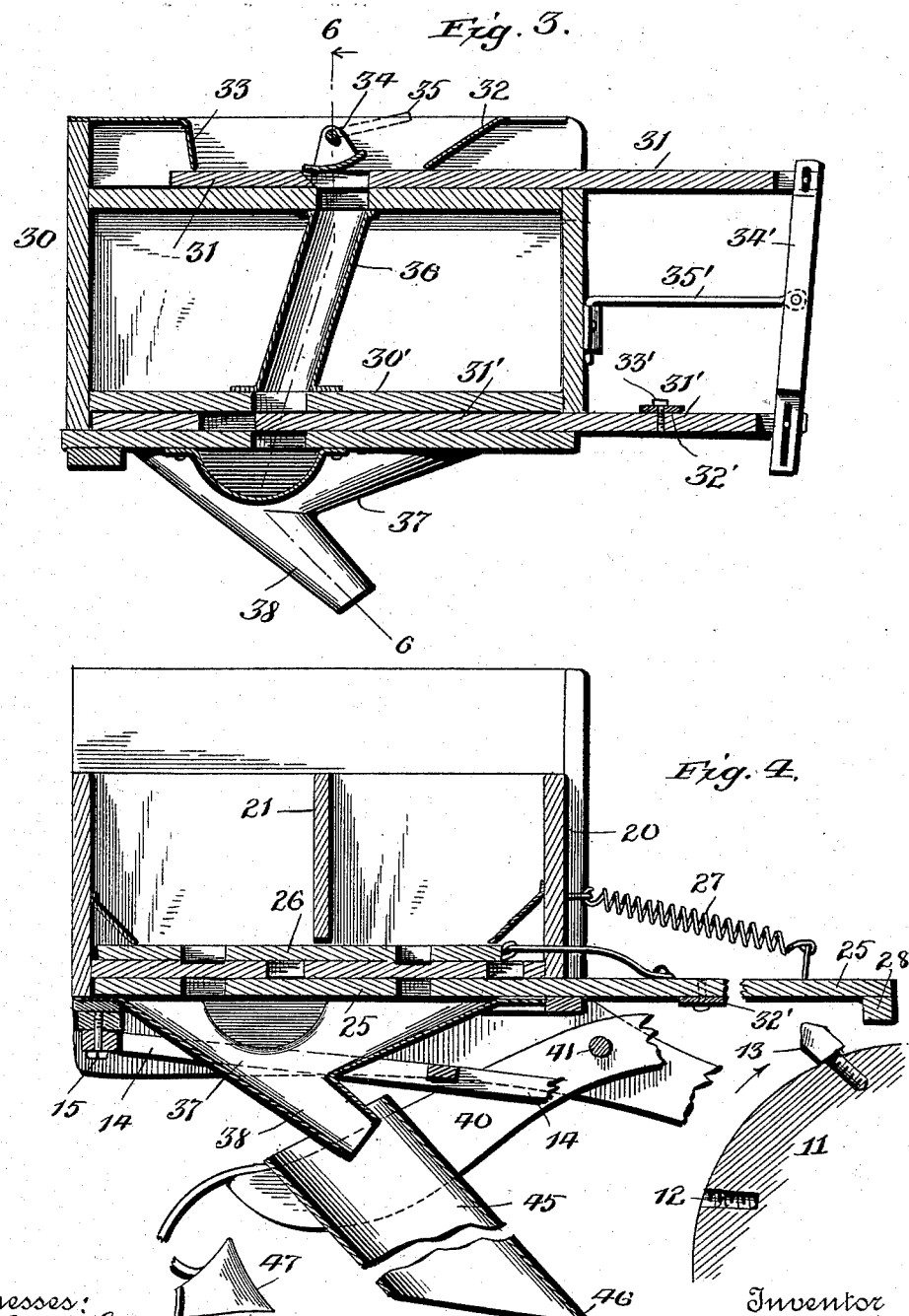

(No Model.) 4 Sheets—Sheet 4.
A. KLINK.
CORN PLANTER.
No. 527,429. Patented Oct. 16, 1894.
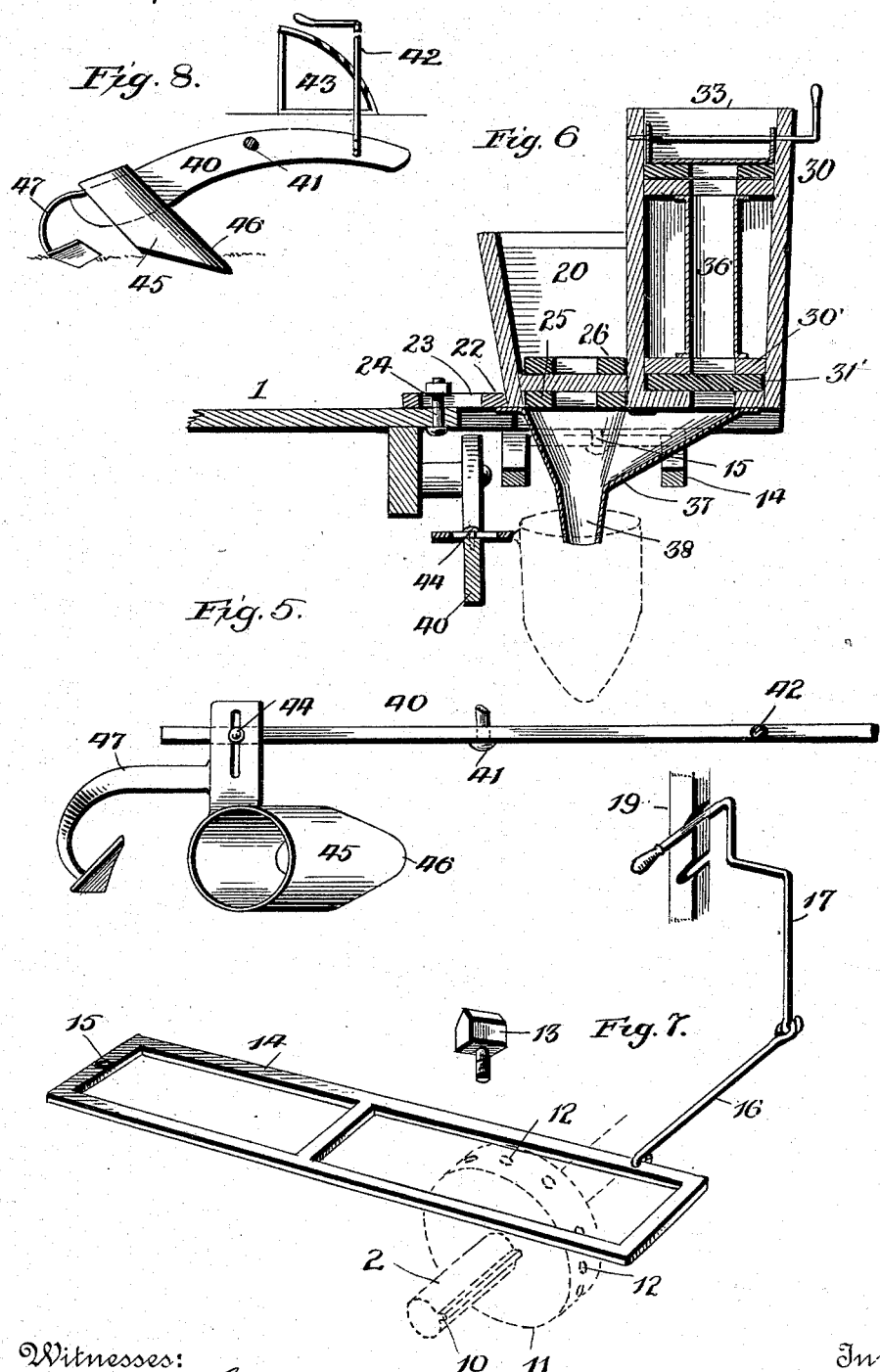
Witnesses:
L. C. Hills
Helena Bauer
Inventor:
Adam Klink,
by Collamer & Co.,
Attorneys

UNITED STATES PATENT OFFICE.

ADAM KLINK, OF COALTOWN, PENNSYLVANIA.

CORN-PLANTER.

SPECIFICATION forming part of Letters Patent No. 527,429, dated October 16, 1894.

Application filed March 12, 1894. Serial No. 503,339. (No model.)

*To all whom it may concern:*

Be it known that I, ADAM KLINK, a citizen of the United States, and a resident of Coaltown, Butler county, State of Pennsylvania, have invented certain new and useful Improvements in Corn Planter; and my preferred manner of carrying out the invention is set forth in the following full, clear, and exact description, terminating with claims particularly specifying the novelty.

This invention relates to planting machines, and more especially to that class thereof known as check row corn planters; and the object of the same is to effect certain improvements in the details of construction.

To this end the invention consists in the mechanism hereinafter described and claimed, and as illustrated on the four sheets of drawings accompanying, wherein—

Figure 2:
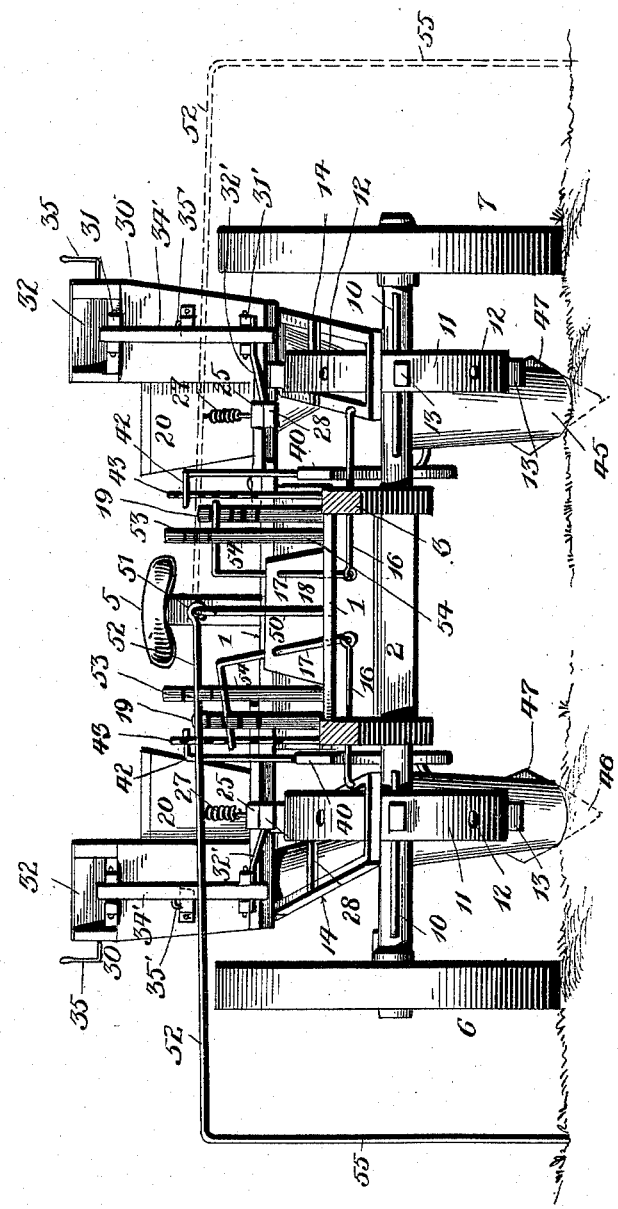
Figure 1:
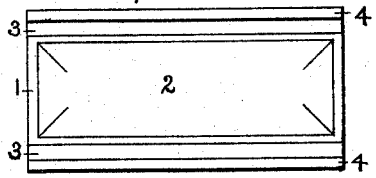
Figure 2:
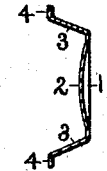
Figure 3:
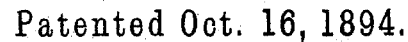
Figure 4:
Figure 5:
Figure 6:
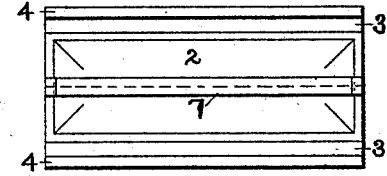
Figure 7:
Figure 8:
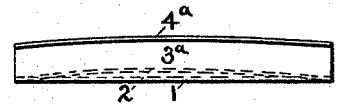
Figure 9:
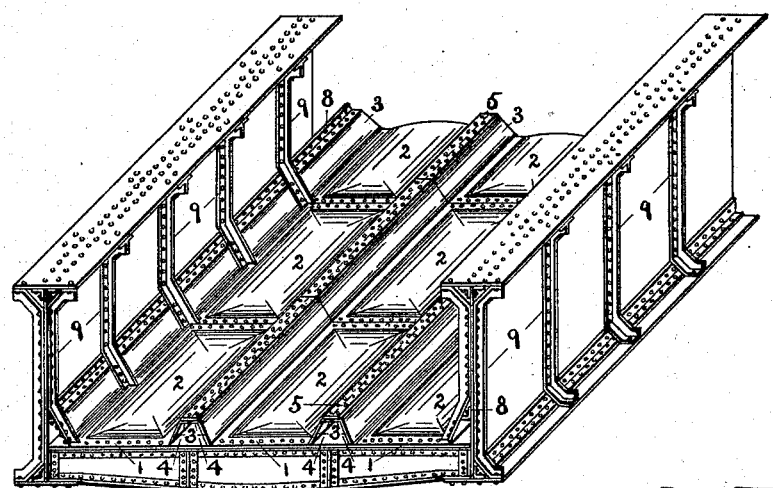

Figure 1 is a plan view of the machine complete. Fig. 2 is a front elevation. Both these views show one side of the machine in operation and the other side at rest. Fig. 3 is a longitudinal section through one pumpkin seed box, on line 3—3 of Fig. 1. Fig. 4 is a similar section through one corn box and phosphate box, on line 4—4 of Fig. 1. Fig. 5 is a plan view of one of the boots with its share, covering arm, and supporting lever. Fig. 6 is a cross section of the machine taken through the gages of the pumpkin seed box and down the chutes therein, on lines 6—6 in Figs. 1 and 3. Fig. 7 is a detail perspective view of one of the cam-wheel shifting-frames and its adjusting mechanism, showing the cam wheel in dotted outline. Fig. 8 is a side elevation of the parts shown in Fig. 5.

Referring to the said drawings, the numeral 1 designates a suitable table which may be supported at the rear if desired but beneath whose forward end is journaled an axle 2 and carries shafts 3 and a singletree 4 as shown, or in some cases a pole and a doubletree where a team is to be attached instead of a single horse. The driver's seat 5 rises from the table near its front end and at a proper point where he can guide the horse or team and also manipulate the various levers. The axle is supported by wheels 6 and 7, the former of which is fast thereon and the latter of which is preferably loose so as to enable the machine to turn corners.

It may as well be understood at starting that the two sides of the machine may be and preferably are precise duplicates of each other so that a description of one will answer for both, although if desired the pumpkin seed box might be omitted from one side or from both sides.

All parts of the machine are of the desired sizes, shapes, materials, and proportions, and considerable change in the specific details may be made without departing from the principle of my invention.

10 is a feather at each end of the axle 2, and splined on this feather so as to slide longitudinally of the axle is a cam wheel 11 having threaded holes 12 in its periphery (about twelve in number) within which are removably screwed pins 13 forming cams for dropping the seed. It will be understood that when all these pins are in place the parts are so timed that the hills will be planted say six inches apart. When every other pin is removed the hills will be twelve inches apart. When every third pin only is in place the hills will be eighteen inches apart, and so on.

14 is a frame pivoted at 15 beneath the rear end of the table and passing astride the cam wheel 11, and 16 is a link connecting the front end of this frame with an upright lever 17 pivoted in a block 18 standing in front of the seat and having a horizontal out-turned arm at its upper end engaging a toothed rack 19 rising from the table; by which construction this arm can be raised or lowered and engaged with the proper tooth so as to move the cam wheel longitudinally of the axle.

20 is the seed box having a transverse partition 21 dividing it into two compartments the forward of which is for corn or seed and the rearward of which is for phosphates. The entire box is supported upon a plate 22 having slots 23 laterally of the machine, and set screws 24 pass through these slots and into the table 1 so as to permit the plate and seed box to be adjusted transversely on the table. By this means one or both seed boxes can be properly adjusted to drop the seed and phosphates in rows of the desired distance apart. Moving under the box 20 is a slide 25, and a second slide 26 is connected with the front end of the slide 25 and moves over the bottom of the box and under the box slides 25 at predetermined intervals. Each forward movement of a slide 25 drops the desired number of seed and phosphate which pass through the hopper and its conductor and spout, and drop through the boots into the furrows formed by the shares and the furrows are immediately closed by the covering arms. Obviously if phosphates are used with the seed, they drop at the same time and are planted in the same hills. If it is desired to plant pumpkin seed also in the same hills, the lower slides 31' are connected by the set-screws 33' with the arms 32' on the slides 25; and thereafter each movement of a slide 25 will cause the slides 31 and 31' to move as above described and drop the pumpkin seed in the desired charge, as will be clear. Meanwhile, as the machine is planting two rows of seed, the depending end 55 of the marker is scratching a line in the earth to indicate to the driver where the machine must be guided on the return trip so as to drop the next two rows at a proper distance from the first two.

What is claimed as new is—

1. In a seed planter, the combination with a table mounted on a suitable support, and planting mechanism carried by said table; of an upright at the center of the front end of the table, a long arm loosely linked at one extremity to the upper end of the upright and having its other extremity turned down, and additional uprights at the corners of the table provided with notches in either of which the body of said arm is adapted to rest, as and for the purpose set forth.

2. In a device of the character described, the combination with a main axle having a feather, a table supported by the axle, a longitudinally reciprocating slide mounted on the table, and a lug beneath the forward end of the slide; of a cam wheel splined on said feather and having threaded openings in its periphery, a number of pins removably mounted in said openings in the periphery of the cam and adapted to engage said lug, a frame pivoted at its rear end beneath the table and standing at the sides of said cam wheel, and means for moving the front end of the frame laterally of the machine, as and for the purpose set forth.

3. In a device of the character described, the combination with a main axle having a feather, a table supported by the axle, a longitudinally reciprocating slide mounted on the table, and a lug beneath the forward end of the slide; of a cam wheel splined on said feather, a number of pins mounted in the periphery of the cam and adapted to engage said lug, a frame pivoted at its rear end beneath the table and standing at the sides of said cam wheel, a block rising from the table, an upright lever pivoted to said block and having a horizontal outturned upper end, a toothed rack rising from the table and with the teeth of which said end engages, and a link connecting the lower end of the lever with the front end of the frame, as and for the purpose set forth.

4. In a seed planter, the combination with a table mounted on a supporting axle, a cam wheel splined on said axle and carrying peripheral pins, a seed box mounted on the table in rear of said wheel, and a spout depending from the box; of a slide moving through the box and having a lug adapted to be tripped by said pins, a frame pivoted at its rear end beneath the table with its body standing astride said spout and cam wheel, and means for adjusting the front end of this frame laterally of the machine, as and for the purpose set forth.

5. In a seed planter, the combination with a table mounted on a supporting axle, a plate resting on the table and having transverse slots, set screws passing through said slots into the table for the purpose set forth, a seed box mounted on the plate, and a longitudinally reciprocating slide beneath the box; of a cam wheel splined on the axle and having peripheral pins engaging said slide, and means for adjusting the cam wheel longitudinally of the axle, substantially as described.

6. In a seed planter, the combination with a table mounted on an axle, a cam wheel splined on said axle and having peripheral teeth, means for adjusting the cam wheel longitudinally of the axle, a transversely slotted plate mounted on the table, and set screws taking through the slots and into the table for the purpose set forth; of a box rigidly mounted on the plate and having a transverse partition dividing it into compartments, slides moving above and below the bottom of the box and connected in front of it, said bottom and both the slides having holes under each compartment adapted to register with each other, a lug on the lower slide engaged by the pins on the cam wheel, a single conductor beneath the holes in both compartments, and a single delivery spout at the lower end of the hopper, substantially as described.

7. In a corn planter, the combination with a table, a seed box supported thereon, means for adjusting the box laterally of the table, a slide in the box, and mechanism for tripping the slide; of a spout beneath the box, a draw-bar pivoted to the table and having an arm at its forward end engaging a rack bar on the table, a tubular boot surrounding said spout, a slot and bolt connecting this boot with the rear end of said draw-bar so as to permit lateral adjustment of the boot, and a share in front and covering arm in rear of the boot, as and for the purpose set forth.

8. In a corn planter, the combination with a table, a seed box supported thereon, means for adjusting the box laterally of the table, a slide in the box, and mechanism for tripping the slide; of a spout beneath the box, a draw-bar pivoted to the table and having an arm at its forward end engaging a rack bar on the table, a tubular boot surrounding said spout, a slot and bolt connecting this boot with the rear end of said draw-bar so as to permit lateral adjustment of the boot, a share carried by the front end of the boot, and a covering arm carried by and in rear of the boot, as and for the purpose set forth.

9. In a seed planter, the combination with a table supported on an axle, and a cam wheel on said axle; of a seed box on the table, a slide therein operated by the cam wheel, a second seed box adjacent the first, a slide therein, an arm projecting from one slide adjacent the other, and a set screw removably passing through the latter slide into the arm, as and for the purpose set forth.

10. In a seed planter, the combination with a table mounted on an axle, a cam wheel splined on said axle, means for adjusting the wheel longitudinally of the axle, a slotted plate mounted on the table, and set screws taking through the slots into the table for permitting the adjustment of the plate laterally of the machine; of independent seed boxes mounted on the plate and provided with independent slides, a lug on one slide tripped by the cam wheel, and detachable connections substantially as described between the two slides, as and for the purpose set forth.

11. In a machine of the character described, the combination with a seed box consisting of upper and lower compartments having holes in their bottoms, a chute connecting said holes, a spout beneath the lower hole, a gage above the upper hole, slides moving just above said bottoms, a rock lever centrally pivoted on a bracket at the front end of the box, and connections between its ends and the two slides whereby the upper hole is normally opened and the lower hole normally closed by their respective slides; of mechanism substantially as described for reciprocating the lower slide, as and for the purpose set forth.

12. In a seed planter, the combination with a seed box having a hole in its bottom, a slide moving over the bottom and also having a hole, a shaft journaled across the box and having a crank-handle at its outer end, and a gage mounted on the shaft above the hole in the box bottom; of a chute below said hole, a slide beneath the chute, and mechanism for reciprocating said slides simultaneously and oppositely, as and for the purpose set forth.

13. In a seed planter, the combination with a seed box having a hole in its bottom, a slide moving over the bottom and also having a hole, a rearward incline at the front of the box, a lip at the rear of the box, the slide moving under the incline and lip, a shaft journaled across the box between the incline and lip and having a crank-handle at its outer end, and a gage mounted on the shaft above the hole in the box bottom; of a chute below said hole, a slide beneath the chute, and mechanism for reciprocating said slides simultaneously and oppositely, as and for the purpose set forth.

In testimony whereof I have hereunto subscribed my signature on this the 9th day of March, A. D. 1894.

ADAM KLINK.

Witnesses:
JAKOB WILHELM,
EMMA KLINK.

(No Model.) 2 Sheets—Sheet 1.

R. KNIGHTS.
FLOOR.

No. 527,430. Patented Oct. 16, 1894.

WITNESSES:
L. A. Stratton
J. H. Graham

INVENTOR:
R. Knights,
by Burridge + Cutter,
Attys.